(12) United States Patent
Kada

(10) Patent No.: US 9,875,079 B1
(45) Date of Patent: Jan. 23, 2018

(54) INFORMATION PROCESSING METHOD AND SYSTEM FOR EXECUTING THE INFORMATION PROCESSING METHOD

(71) Applicant: COLOPL, Inc., Tokyo (JP)

(72) Inventor: Takeshi Kada, Chiba (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/642,137

(22) Filed: Jul. 5, 2017

(30) Foreign Application Priority Data

Jul. 7, 2016 (JP) .................. 2016-135192

(51) Int. Cl.
*G06F 3/16* (2006.01)
*G09G 5/38* (2006.01)
*G06F 3/01* (2006.01)

(52) U.S. Cl.
CPC ............... *G06F 3/165* (2013.01); *G09G 5/38* (2013.01); *G06F 3/012* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| 5,993,318 A | 11/1999 | Kousaki |
| 6,011,526 A | 1/2000 | Toyoshima et al. |
| 2017/0046881 A1 | 2/2017 | Kuribara |
| 2017/0127035 A1 | 5/2017 | Kon et al. |

FOREIGN PATENT DOCUMENTS

| JP | 9-284676 A | 10/1997 |
| JP | 10-137445 A | 5/1998 |
| JP | 2003-348699 A | 12/2003 |
| JP | 2016-115122 A | 6/2016 |
| WO | 2015/162947 A1 | 10/2015 |

OTHER PUBLICATIONS

Decision to Grant a Patent in JP Application No. 2016-135192, dated Nov. 22, 2016, 5 pp.
[CEDEC 2015] What should be 'avoided' in VR? Oculus VR teaches a technique for comfort VR content production, [online], Aug. 22, 2015, 4Gamer.net, [retrieved on Jan. 13, 2016], Internet <URL: http://www.4gamer.net/games/195/G019528/20150828092/>, 13 pp.

*Primary Examiner* — Vu Nguyen
(74) *Attorney, Agent, or Firm* — Hauptman Ham, LLP

(57) ABSTRACT

An information processing method includes defining a virtual space for immersing a user wearing a head mounted display (HMD). The virtual space includes a viewpoint of the user, a sound collecting object separated from the viewpoint of the user, and a sound source object. The method includes processing sound data based on a relative positional relationship between the sound collecting object and the sound source object. The method includes instructing a sound outputting unit to output a sound based on the processed sound data. The method includes determining whether or not the viewpoint of the user is moved without synchronization with the movement of the HMD. In response to a determination that the viewpoint of the user is moved without synchronization with movement of the HMD, moving the sound collecting object so that the distance between the moved viewpoint of the user and the sound collecting object is decreased.

8 Claims, 11 Drawing Sheets

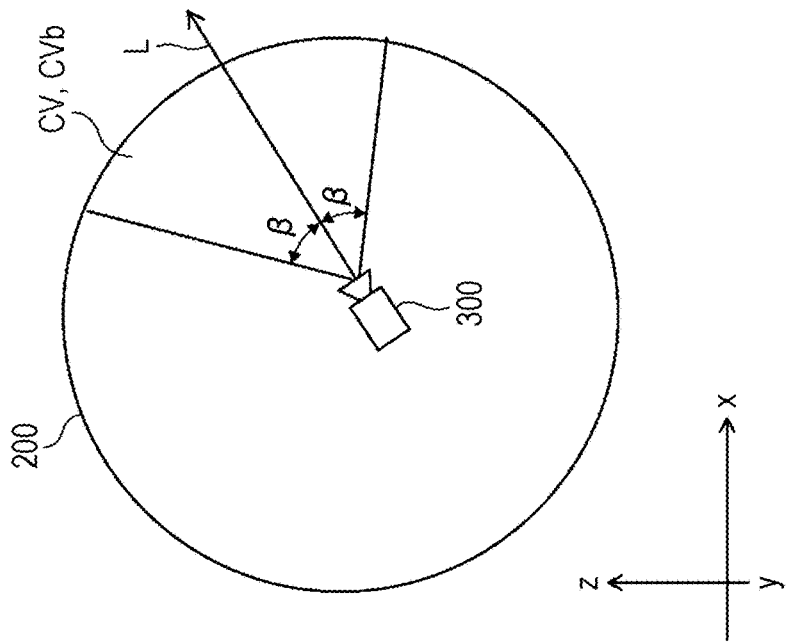
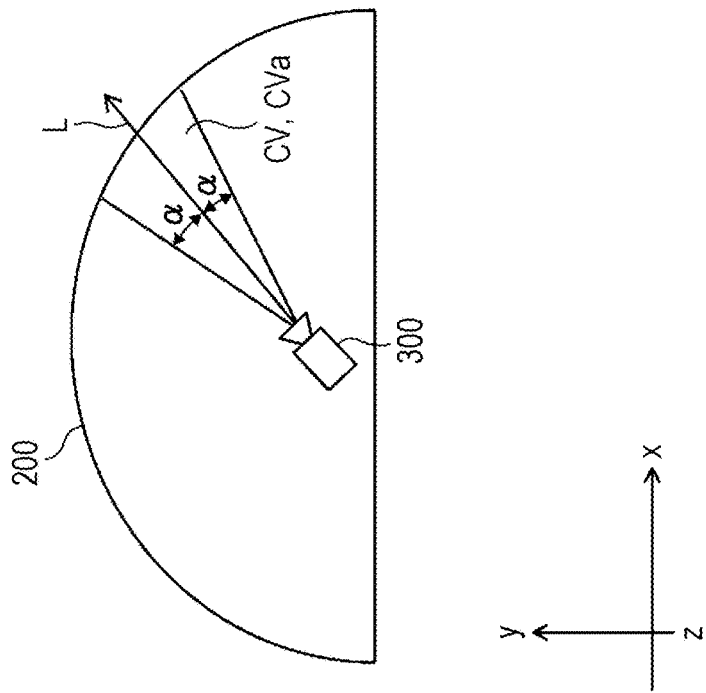

FIG. 7
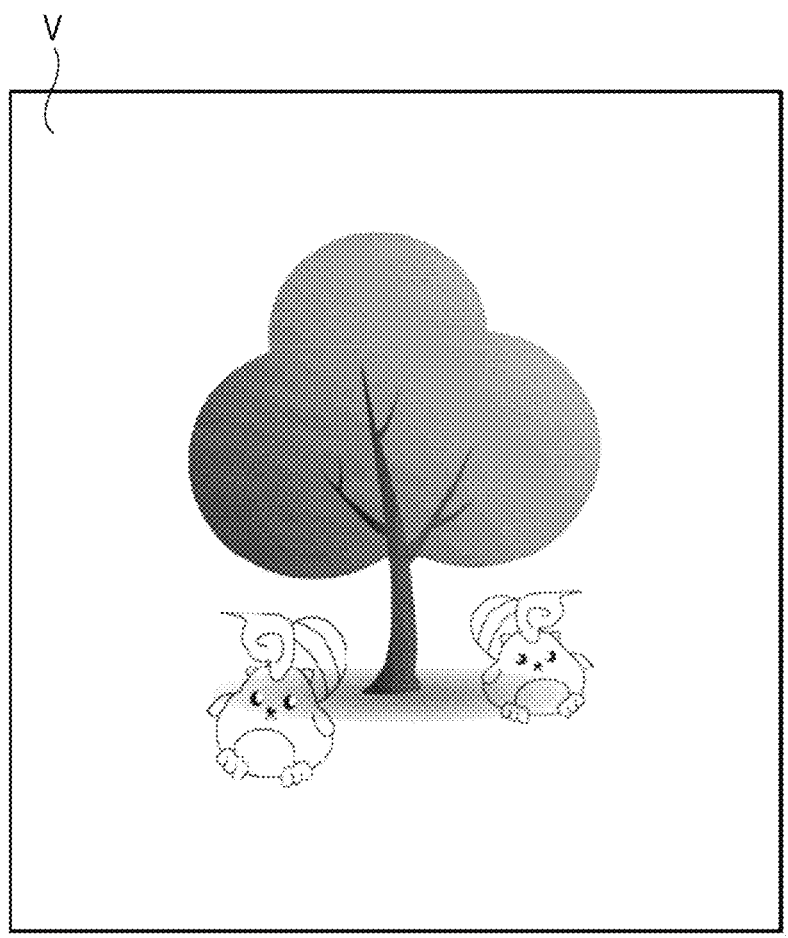
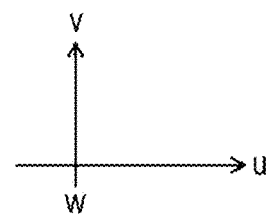

*FIG. 9*
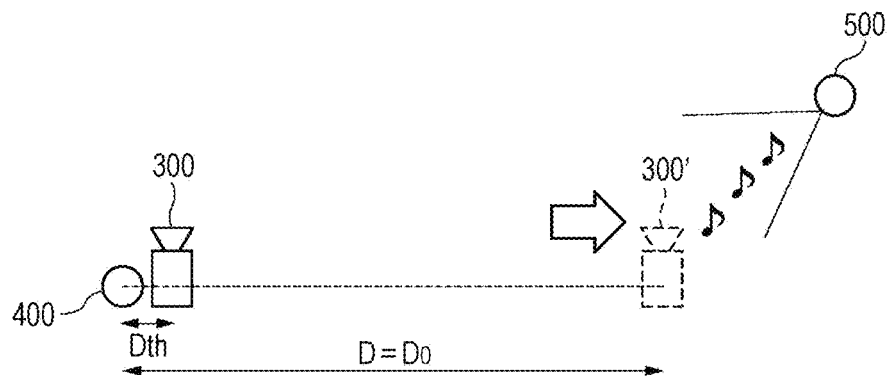
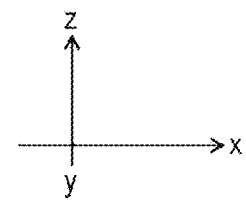
*FIG. 10*
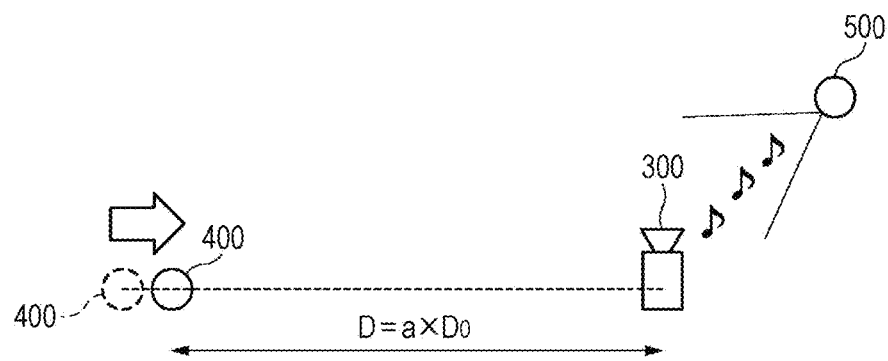
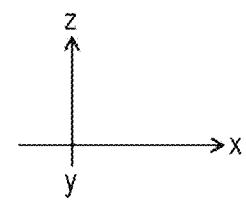

FIG. 11
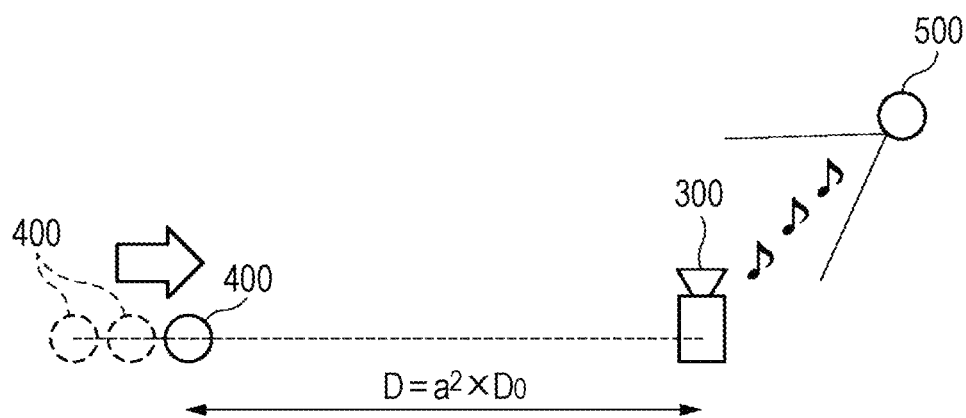
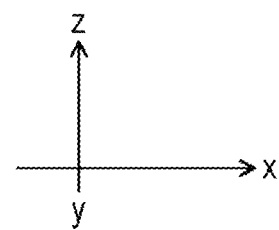

INFORMATION PROCESSING METHOD AND SYSTEM FOR EXECUTING THE INFORMATION PROCESSING METHOD

RELATED APPLICATIONS

The present application claims priority to Japanese Patent Application Number 2016-135192 filed Jul. 7, 2016, the disclosure of which is hereby incorporated by reference herein in its entirety.

BACKGROUND

This disclosure relates to an information processing method and a system for executing the information processing method.

For example, in Japanese Patent Application Laid-open No. 2016-115122, the following head mounted display system is disclosed. While an application program is running, the head mounted display system performs processing of changing a display of a visual-field image, which is displayed in a head mounted display (hereinafter referred to as "HMD") in synchronization with a movement of a head of a user wearing the HMD. Meanwhile, the display of the visual-field image can be changed with use of a controller that is connected to the HMD so as to be capable of communicating to/from the HMD.

When the visual-field image is updated by moving the position and the direction of a virtual camera with use of the controller without synchronization with the movement of the HMD, the user experiences a visual effect that is not synchronized with the movement of the HMD, and hence there is a high risk of causing a visually induced motion sickness (so-called virtual reality (VR) sickness). In particular, as disclosed in "[CEDEC 2015] What should be 'avoided' in VR? Oculus VR teaches a technique for comfort VR content production," [online], Aug. 22, 2015, 4Gamer.net, [retrieved on Jan. 13, 2016], Internet <URL: http://www.4gamer.net/games/195/G019528/20150828092/>, for example, when the virtual camera is moved backward, moved at high speed, or moved in a curved motion, the user is more susceptible to the VR sickness. Meanwhile, in order to prevent the user's VR sickness, instantaneously moving the virtual camera (also referred to as "teleportation"), is conceivable. When the virtual camera is instantaneously moved, and when a sound source object defined as a sound source of sound data is present near a movement destination of the virtual camera, the virtual camera having a sound collecting function suddenly approaches the sound source object. Therefore, a loud sound is suddenly output from a sound outputting unit, for example, headphones worn by the user, and hence the user may be startled by the sound. As described above, suddenly moving the virtual camera, without synchronization with the movement of the HMD, impacts not only VR sickness due to the change of the visual-field image but also startling the user due to the sudden volume change of the sound.

SUMMARY

At least one embodiment of this disclosure has an object to provide an information processing method and a system for executing the information processing method, which are capable of preventing or reducing a risk of a situation where a user immersed in a virtual space is startled, without reducing a user's sense of immersion to the virtual space.

According to at least one embodiment of this disclosure, there is provided an information processing method for use in a system including a head mounted display (HMD) and a sound outputting unit.

The information processing method includes generating virtual space data that defines a virtual space including a virtual camera, which defines a visual axis for specifying a visual-field image to be displayed on the head mounted display in synchronization with a movement of the head mounted display, a sound collecting object, which is separated from the virtual camera and follows the virtual camera, and a sound source object, which is defined as a sound source of sound data. The method further includes processing the sound data based on a relative positional relationship between the sound collecting object and the sound source object. The method further includes causing the sound outputting unit to output a sound based on the processed sound data. The method further includes determining whether or not the virtual camera is moved without synchronization with the movement of the head mounted display. In response to a determination that the virtual camera is moved without synchronization with movement of the HMD, the information processing method further includes specifying a distance between the virtual camera and the sound collecting object based on a position of the moved virtual camera and a position of the sound collecting object; and moving the sound collecting object so that the distance between the moved virtual camera and the sound collecting object is gradually decreased.

According to at least one embodiment, the information processing method is capable of preventing or reducing a risk of a situation where the user immersed in the virtual space is startled, without reducing the user's sense of immersion to the virtual space. Further, the system is able to execute the information processing method.

BRIEF DESCRIPTION OF THE DRAWINGS

FIG. 6A is a yx plane diagram of the virtual space illustrated in FIG. 5 according to at least one embodiment of this disclosure.

FIG. 6B is a zx plane diagram of the virtual space illustrated in FIG. 5 according to at least one embodiment of this disclosure.

FIG. 7 is a diagram of an example of a visual-field image displayed on the HMD according to at least one embodiment of this disclosure.

FIG. 9 is a schematic diagram of a state in which the virtual camera is moved close to a sound source object according to at least one embodiment of this disclosure.

FIG. 10 is a schematic diagram of a state in which a sound collecting object is moved so that a distance D between the moved virtual camera and the sound collecting object is set to $a \times D_0$ according to at least one embodiment of this disclosure.

FIG. 11 is a schematic diagram of a state in which the sound collecting object is moved so that the distance D between the moved virtual camera and the sound collecting object is set to $a^2 \times D_0$ according to at least one embodiment of this disclosure.

DESCRIPTION OF THE EMBODIMENTS

Figure 1:
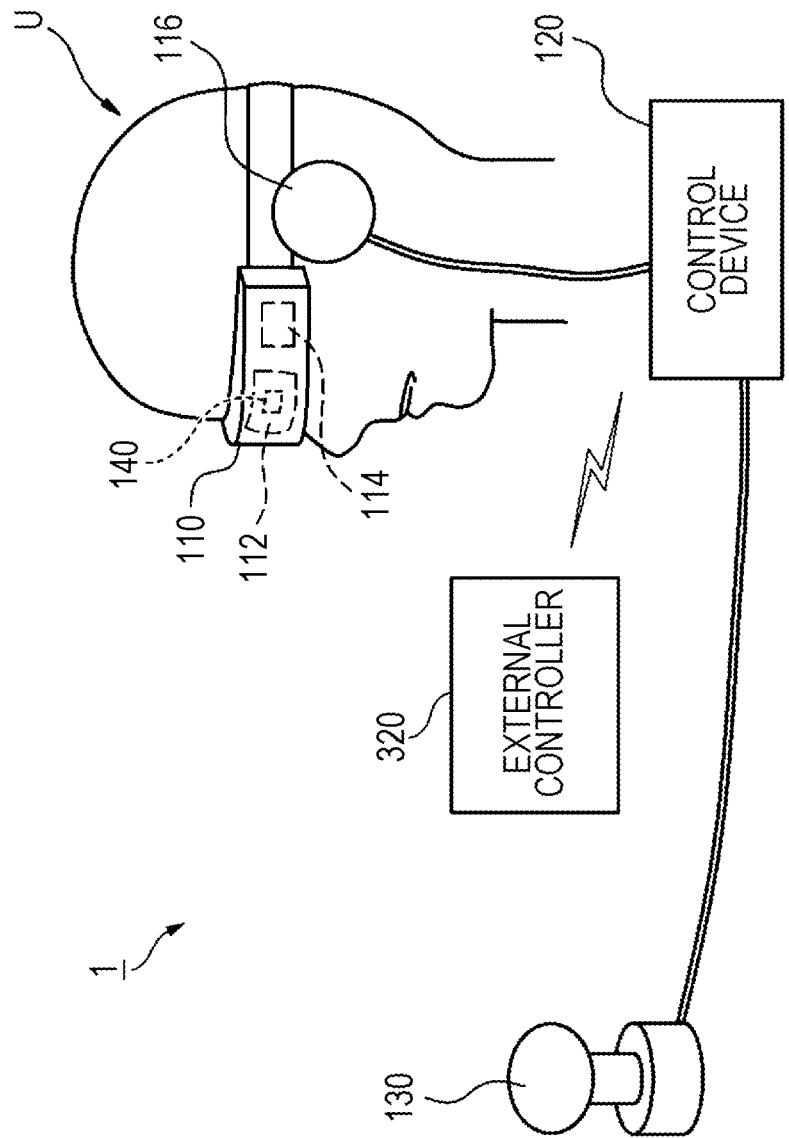
FIG. 1 is a schematic view of a head mounted display (HMD) system according to at least one embodiment of this disclosure.

A summary of at least one embodiment of this disclosure is described.

(1) An information processing method executed by a system including a head mounted display (HMD) and a sound outputting unit. The information processing method includes generating virtual space data that defines a virtual space including a virtual camera, which defines a visual axis for specifying a visual-field image to be displayed on the HMD in synchronization with a movement of the HMD, a sound collecting object, and a sound source object, which is defined as a sound source of sound data. The information processing method further includes processing the sound data based on a relative positional relationship between the sound collecting object and the sound source object. The information processing method further includes causing the sound outputting unit to output a sound based on the processed sound data. The information processing method further includes determining whether or not the virtual camera is moved without synchronization with the movement of the HMD. In response to a determination that the virtual camera moved without synchronization of movement of the HMD, the information processing method further includes specifying a distance between the virtual camera and the sound collecting object based on a position of the moved virtual camera and a position of the sound collecting object; and moving the sound collecting object so that the distance between the moved virtual camera and the sound collecting object is gradually decreased.

According to the above-mentioned method, in response to a determination that the virtual camera is moved without synchronization with the movement of the HDM, the distance between the moved virtual camera and the sound collecting object is specified based on the position of the moved virtual camera and the position of the sound collecting object. The sound collecting object is moved so that the distance between the moved virtual camera and the sound collecting object is gradually decreased. In this manner, for example, when the virtual camera instantaneously moves without synchronization with the movement of the head mounted display, the sound collecting object does not move instantaneously so as to follow the virtual camera, but gradually moves so as to approach the virtual camera. Therefore, a risk of a situation where a loud sound is suddenly output from the sound outputting unit is reduced or prevented, and the user's sense of immersion to the virtual space is prevented from being reduced. Therefore, providing the information processing method capable of preventing a situation where the user immersed in the virtual space is startled, without reducing the user's sense of immersion to the virtual space is possible.

(2) An information processing method according to Item (1), in which the step determining whether or not the virtual camera is moved without synchronization with the movement of the head mounted display is determined in each frame of the visual-field image.

According to the above-mentioned method, a determination is made regarding whether or not the virtual camera is moved without synchronization with the movement of the head mounted display in each frame of the visual-field image. Therefore, preventing or reducing a risk of a situation where the user immersed in the virtual space is startled even when the virtual camera is instantaneously moved is possible.

(3) An information processing method according to Item (1) or (2), in which the moving the sound collecting object is executed until the distance between the moved virtual camera and the sound collecting object becomes equal to or smaller than a predetermined value.

According to the above-mentioned method, the sound collecting object is moved so that the distance between the virtual camera and the sound collecting object is gradually decreased until the distance between the virtual camera and the sound collecting object becomes equal to or smaller than the predetermined value. In this manner, the distance between the virtual camera and the sound collecting object becomes equal to or smaller than the predetermined value even when the virtual camera is moved, and hence the sense of immersion to the virtual space can be prevented from being reduced.

(4) An information processing method according to any one of Items (1) to (3), in which moving the sound collecting object includes moving the sound collecting object so that a value obtained by multiplying the distance between the moved virtual camera and the sound collecting object by a predetermined coefficient is a new distance between the virtual camera and the sound collecting object. The predetermined coefficient is a value that is smaller than 1. The sound collecting object, after being moved, is positioned on a line segment between the sound collecting object before being moved and the virtual camera. The information processing method further includes repeatedly moving the sound collecting object.

According to the above-mentioned method, the sound collecting object is moved so that the value obtained by multiplying the distance between the virtual camera and the sound collecting object by the predetermined coefficient (value that is smaller than 1) becomes the new distance between the virtual camera and the sound collecting object, and this processing is repeatedly executed.

In this manner, the sound collecting object can be moved so that the distance between the virtual camera and the sound collecting object may be gradually decreased.

(5) An information processing method according to Item (4), in which, when a predetermined frame of a plurality of frames of the visual-field image satisfies a predetermined condition, the moving of the sound collecting object is executed in the predetermined frame According to the above-mentioned method, when the predetermined frame satisfies the predetermined condition, in the predetermined frame, the sound collecting object is moved so that the value obtained by multiplying the distance between the virtual camera and the sound collecting object by the predetermined coefficient (value that is smaller than 1) becomes the new distance between the virtual camera and the sound collecting object. In this manner, the sound collecting object is moved only in the frame in which the predetermined condition is satisfied. Therefore, the distance between the virtual camera and the sound collecting object can be gradually decreased at appropriate time intervals. For example, when a frame rate of a game moving image (visual-field image) is 90 fps, and when the distance between the virtual camera and the sound collecting object is decreased at intervals of 30 frames, the distance between the virtual camera and the sound collecting object is gradually decreased at intervals of about 0.3 second. As described above, reliably prevention of a situation where the user immersed to the virtual space is startled is possible.

(6) An information processing method according to Item 4, in which the moving of the sound collecting object is executed in each of a plurality of frames of the visual-field image.

According to the above-mentioned method, in each of the plurality of frames of the visual-field image, the sound collecting object is moved so that the value obtained by multiplying the distance between the virtual camera and the sound collecting object by the predetermined coefficient (value that is smaller than 1) becomes the new distance between the virtual camera and the sound collecting object. In this manner, the sound collecting object approaches the moved virtual camera as quickly as possible. Therefore, the performance of the sound collecting object to follow the virtual camera is increased, and the sense of immersion to the virtual space (that is, the sense of presence in the virtual space) can be prevented from being reduced.

(7) An information processing method according to Item (4) or (5), in which, in response to a determination that the virtual camera is moved in a predetermined frame of a plurality of frames of the visual-field image, the moving of the sound collecting object is executed in the predetermined frame.

According to the above-mentioned method, in response to a determination that the virtual camera is moved in the predetermined frame, in the predetermined frame, the sound collecting object is moved so that the value obtained by multiplying the distance between the virtual camera and the sound collecting object by the predetermined coefficient (value that is smaller than 1) becomes the new distance between the virtual camera and the sound collecting object. In this manner, the sound collecting object is moved immediately after a determination that the virtual camera is moved. Therefore, the performance of the sound collecting object to follow the virtual camera is increased, and the sense of immersion to the virtual space (that is, the sense of presence in the virtual space) can be prevented from being reduced.

(8) A system for executing the information processing method of any one of Items (1) to (7).

According to the above-mentioned item, providing a system capable of reducing or preventing a risk of a situation where the user immersed in the virtual space is startled, without reducing the user's sense of immersion to the virtual space is possible.

At least one embodiment of this disclosure is described below with reference to the drawings. Once a component is described in this description of the embodiment, a description on a component having the same reference number as that of the already described component is omitted for the sake of convenience.

FIG. 1 is a schematic diagram of a head mounted display (hereinafter simply referred to as "HMD") system 1 according to at least one embodiment of this disclosure. In FIG. 1, the HMD system 1 includes an HMD 110 worn on a head of a user U, headphones 116 (example of a sound outputting unit), a position sensor 130, an external controller 320, and a control device 120.

The HMD 110 includes a display unit 112, an HMD sensor 114, and an eye gaze sensor 140. The display unit 112 includes a non-transmissive display device (or a partially transmissive display device) configured to completely cover a field of view (visual field) of the user U wearing the HMD 110. With this, the user U can see a visual-field image displayed on the display unit 112, and hence the user U can be immersed in a virtual space. In at least one embodiment, the user U can see only a visual-field image displayed on the display unit 112. The display unit 112 may include a left-eye display unit configured to provide an image to a left eye of the user U, and a right-eye display unit configured to provide an image to a right eye of the user U.

The HMD sensor 114 is mounted near the display unit 112 of the HMD 110. The HMD sensor 114 includes at least one of a geomagnetic sensor, an acceleration sensor, or an inclination sensor (for example, an angular velocity sensor or a gyro sensor), and can detect various movements of the HMD 110 worn on the head of the user U.

The eye gaze sensor 140 has an eye tracking function of detecting a line-of-sight direction of the user U. For example, the eye gaze sensor 140 may include a right-eye gaze sensor and a left-eye gaze sensor. The right-eye gaze sensor may be configured to detect reflective light reflected from the right eye (in particular, the cornea or the iris) of the user U by irradiating the right eye with, for example, infrared light, to thereby acquire information relating to a rotational angle of a right eyeball. Meanwhile, the left-eye gaze sensor may be configured to detect reflective light reflected from the left eye (in particular, the cornea or the iris) of the user U by irradiating the left eye with, for example, infrared light, to thereby acquire information relating to a rotational angle of a left eyeball.

The headphones 116 are worn on right and left ears of the user U. The headphones 116 are configured to receive sound data (electrical signal) from the control device 120 and to output sounds based on the received sound data. The sound to be output to a right-ear speaker of the headphones 116 may be different from the sound to be output to a left-ear speaker of the headphones 116. For example, the control device 120 may be configured to generate first sound data to be input to the right-ear speaker and second sound data to be input to the left-ear speaker based on a head-related transfer function, to thereby output those two different pieces of sound data to the headphones 116. As another example of the sound outputting unit, two independent stationary speakers or earphones may be provided.

The position sensor 130 is constructed of, for example, a position tracking camera, and is configured to detect the positions of the HMD 110 and the external controller 320. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 is configured to detect information relating to positions, inclinations, and/or light emitting intensities of a plurality of detection points (not shown) provided in the external controller 320. The detection points are, for example, light emitting portions configured to emit infrared light or visible light. Further, the position sensor 130 may include an infrared sensor or a plurality of optical cameras.

The external controller 320 is used to control, for example, a movement of a finger object to be displayed in the virtual space. The external controller 320 may include a right-hand external controller to be used by being held by a right hand of the user U, or a left-hand external controller to be used by being held by a left hand of the user U. The right-hand external controller is a device configured to detect the position of the right hand and the movement of the fingers of the right hand of the user U. The left-hand external controller is a device configured to detect the position of the left hand and the movement of the fingers of the left hand of the user U. The external controller 320 may include a plurality of operation buttons, a plurality of detection points, a sensor, and a transceiver. For example, when the operation button of the external controller 320 is operated by the user U, a menu object may be displayed in the virtual space. Further, when the operation button of the external controller 320 is operated by the user U, the visual field of the user U on the virtual space may be changed (that is, the visual-field image may be changed). In this case, the control device 120 may move the virtual camera to a predetermined position in the virtual space based on an operation signal output from the external controller 320.

The control device 120 is capable of acquiring information of the position of the HMD 110 based on the information acquired from the position sensor 130, and accurately associating the position of the virtual camera in the virtual space with the position of the user U wearing the HMD 110 in the real space based on the acquired information of the position of the HMD 110. The virtual camera defines a viewpoint of the user U in the virtual space. Further, the control device 120 is capable of acquiring information of the position of the external controller 320 based on the information acquired from the position sensor 130, and accurately associating the position of the finger object to be displayed in the virtual space with a relative positional relationship between the external controller 320 and the HMD 110 in the real space based on the acquired information of the position of the external controller 320.

Further, the control device 120 is capable of specifying each of the line of sight of the right eye and the line of sight of the left eye of the user U based on the information transmitted from the eye gaze sensor 140, to thereby specify a point of gaze being an intersection between the line of sight of the right eye and the line of sight of the left eye. Further, the control device 120 is capable of specifying a line-of-sight direction of the user U based on the specified point of gaze. In at least one embodiment, the line-of-sight direction of the user U is a line-of-sight direction of both eyes of the user U, and matches with a direction of a straight line passing through the point of gaze and a midpoint of a line segment connecting between the right eye and the left eye of the user U.

Figure 2:
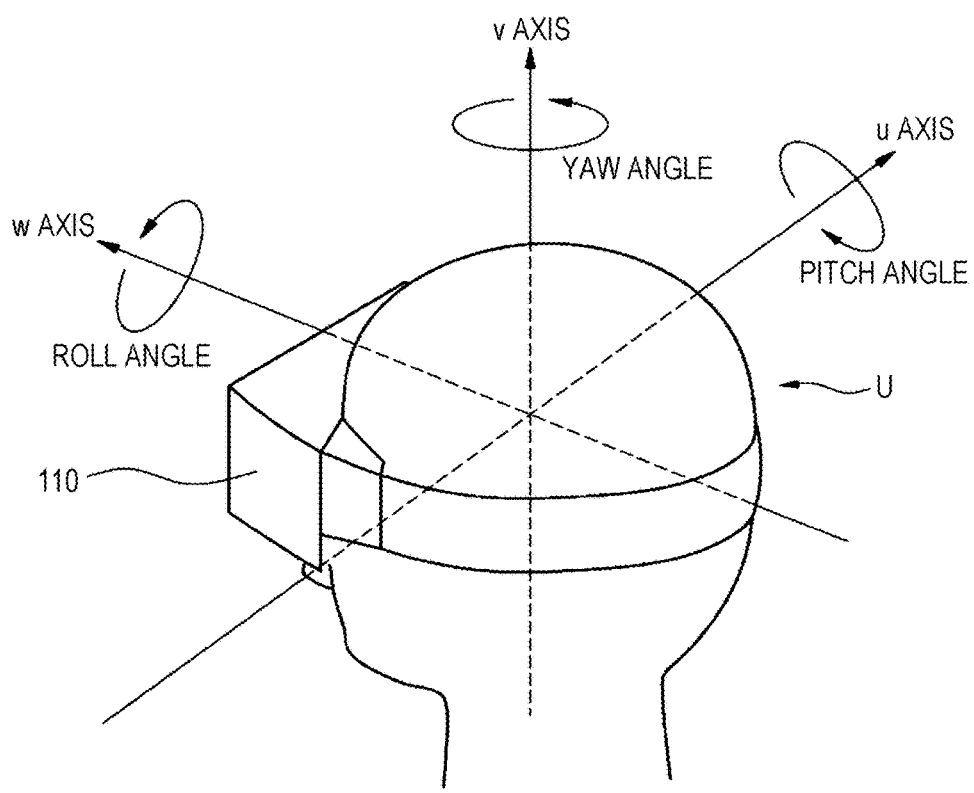
FIG. 2 is a diagram of a head of a user wearing an HMD according to at least one embodiment of this disclosure.

Next, with reference to FIG. 2, a method of acquiring information relating to a position and an inclination of the HMD 110 is described. FIG. 2 is a diagram of a head of the user U wearing the HMD 110 according to at least one embodiment of this disclosure. The information relating to the position and the inclination of the HMD 110, which are synchronized with the movement of the head of the user U wearing the HMD 110, can be detected by the position sensor 130 and/or the HMD sensor 114 mounted on the HMD 110. In FIG. 2, three-dimensional coordinates (uvw coordinates) are defined about the head of the user U wearing the HMD 110. A perpendicular direction in which the user U stands upright is defined as a v axis, a direction being orthogonal to the v axis and passing through the center of the HMD 110 is defined as a w axis, and a direction orthogonal to the v axis and the w axis is defined as a u direction. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera based on the detected change in angles about the respective uvw axes.

Figure 3:
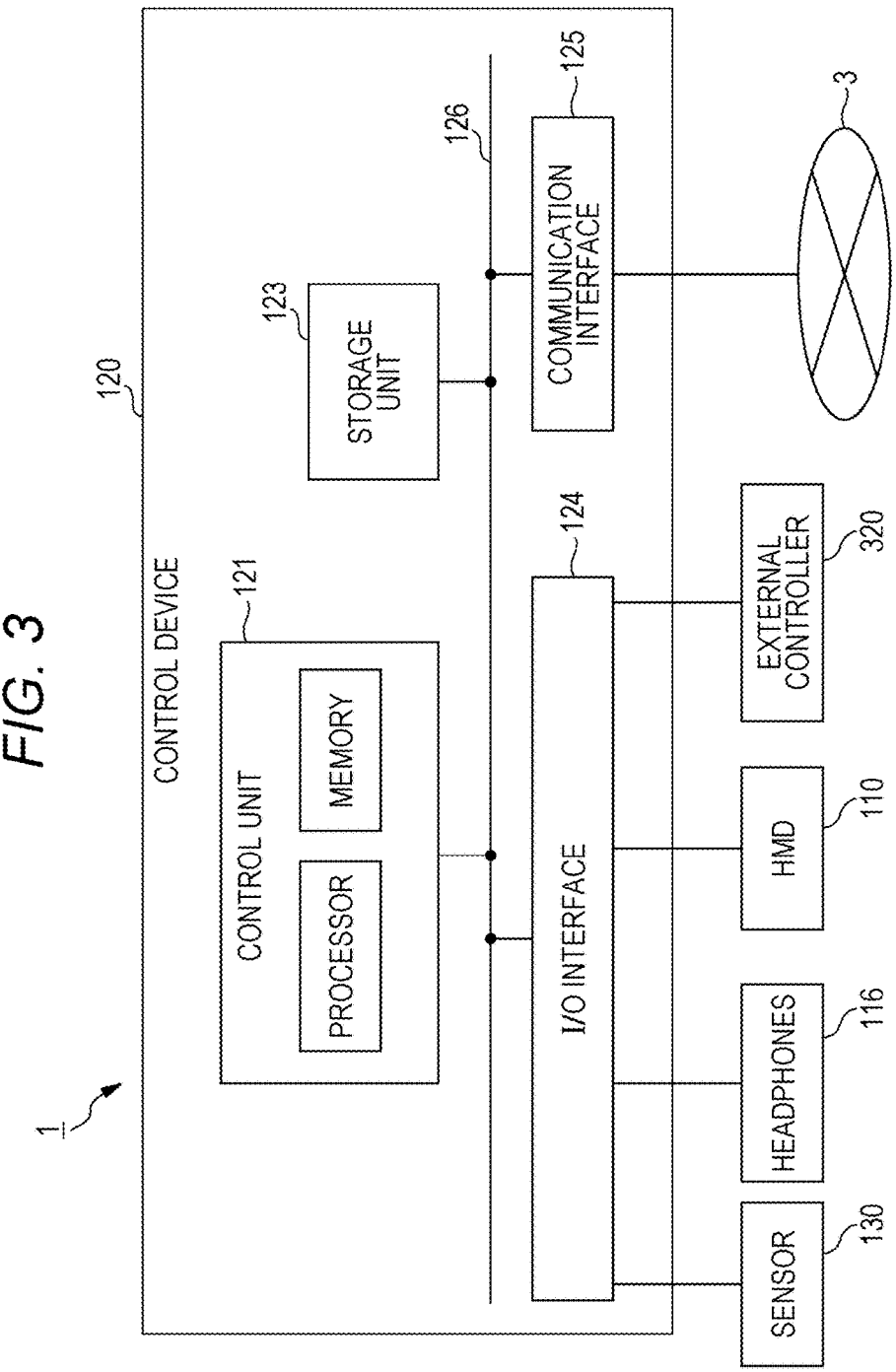
FIG. 3 is a diagram of a hardware configuration of a control device according to at least one embodiment of this disclosure.

Next, with reference to FIG. 3, a hardware configuration of the control device 120 is described. FIG. 3 is a diagram of a hardware configuration of the control device 120 according to at least one embodiment of this disclosure. In FIG. 3, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separate from the HMD 110, or may be built into the HMD 110. Further, a part of the functions of the control device 120 may integral with the HMD 110, and the remaining functions of the control device 120 may be separate from the HMD 110.

The control unit 121 includes a memory and a processor. The memory is constructed of, for example, a read only memory (ROM) having various programs and the like stored therein or a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to develop, on the RAM, instructions designated by various programs installed into the ROM to execute various types of processing in cooperation with the RAM.

In particular, the control unit 121 may control various operations of the control device 120 by causing the processor to develop, on the RAM, a program (to be described later) for causing a computer to execute the information processing method according to at least embodiment to execute the instructions in cooperation with the RAM. The control unit 121 executes a predetermined application (for example, a game program) stored in the memory or the storage unit 123 to display a virtual space (visual-field image) on the display unit 112 of the HMD 110. With this, the user U can be immersed in the virtual space displayed on the display unit 112.

The storage unit (storage) 123 is a storage device, for example, a hard disk drive (HDD), a solid state drive (SSD), or a USB flash memory, and is configured to store instructions and various types of data. The storage unit 123 may store the instructions for causing the computer to execute the information processing method according to at least one embodiment. Further, the storage unit 123 may store instructions for authentication of the user U and game programs including data relating to various images and objects. Further, a database including tables for managing various types of data may be constructed in the storage unit 123.

The I/O interface 124 is configured to connect each of the position sensor 130, the HMD 110, the external controller 320, and the headphones 116 to the control device 120 so as to enable communication therebetween, and is constructed of, for example, a universal serial bus (USB) terminal, a digital visual interface (DVI) terminal, or a High-Definition Multimedia Interface® (HDMI) terminal. The control device 120 may be wirelessly connected to each of the position sensor 130, the HMD 110, and the external controller 320.

The communication interface 125 is configured to connect the control device 120 to a communication network 3, for example, a local area network (LAN), a wide area network (WAN), or the Internet. The communication interface 125 includes various wire connection terminals and various processing circuits for wireless connection for communication to/from an external device, for example, an external server, via the communication network 3, and is configured to adapt to communication standards for communication via the communication network 3.

Figure 4:
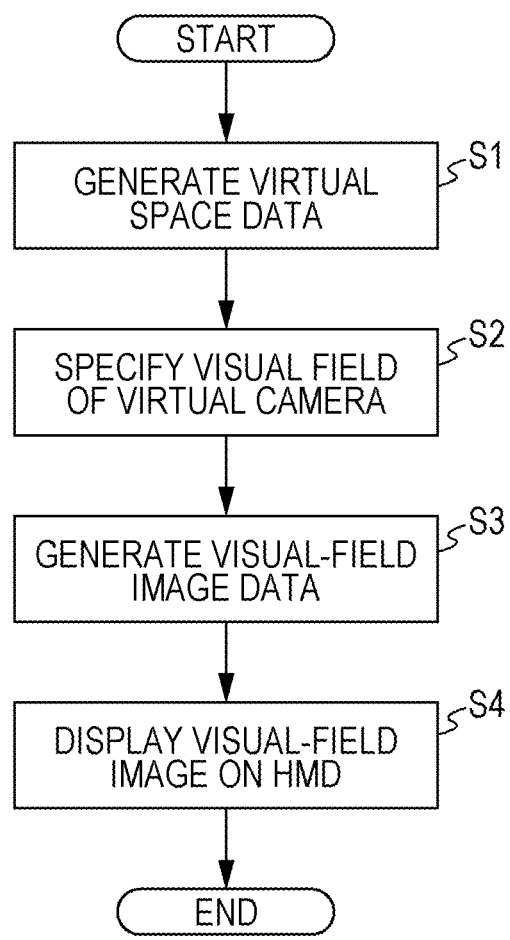
FIG. 4 is a flow chart of a method of displaying a visual-field image on the HMD according to at least one embodiment of this disclosure.
Figure 5:
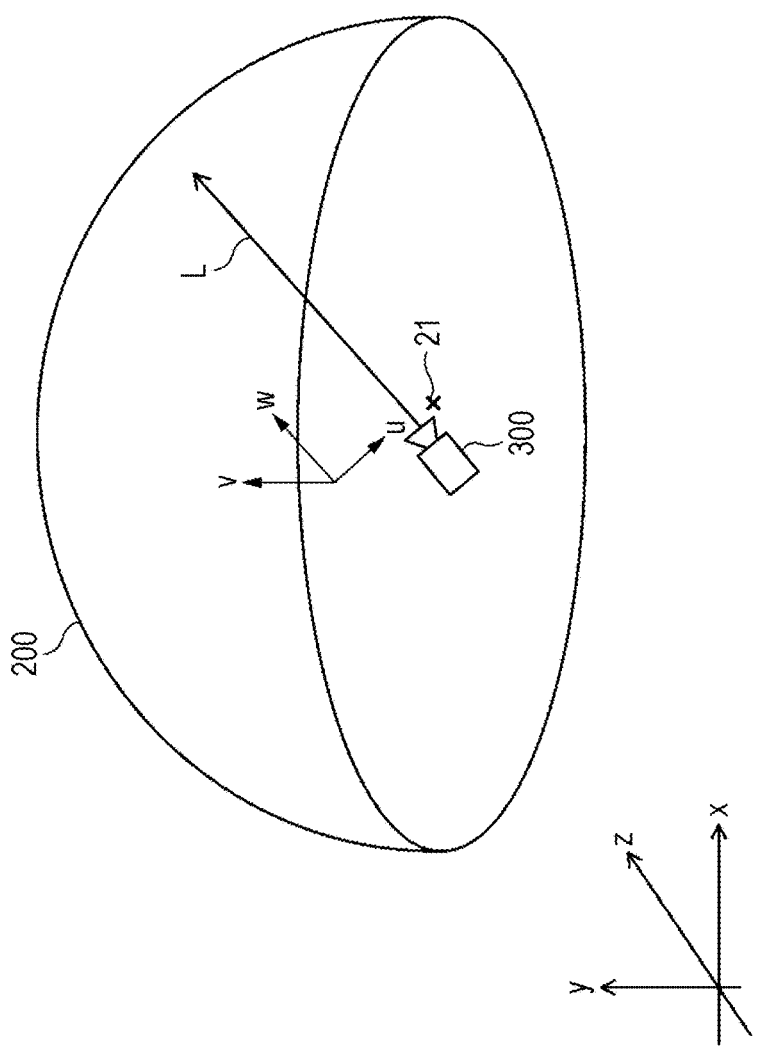
FIG. 5 is an xyz spatial diagram of an example of a virtual space according to at least one embodiment of this disclosure.

Next, with reference to FIG. 4 to FIG. 7, processing for displaying the visual-field image on the HMD 110 is described. FIG. 4 is a flow chart of a method of displaying the visual-field image on the HMD 110 according to at least one embodiment of this disclosure. FIG. 5 is an xyz spatial diagram of an example of a virtual space 200 according to at least one embodiment of this disclosure. FIG. 6A is a yx plane diagram of the virtual space 200 illustrated in FIG. 5 according to at least one embodiment of this disclosure. FIG. 6B is a zx plane diagram of the virtual space 200 illustrated in FIG. 5 according to at least one embodiment of this disclosure. FIG. 7 is a diagram of an example of a visual-field image V displayed on the HMD 110 according to at least one embodiment of this disclosure.

In FIG. 4, in Step S1, the control unit 121 (see FIG. 3) generates virtual space data representing the virtual space 200 including a virtual camera 300 and various objects. In FIG. 5, the virtual space 200 is defined as an entire celestial sphere having a center position 21 as the center (in FIG. 5, only the upper-half celestial sphere is illustrated). Further, in the virtual space 200, an xyz coordinate system having the center position 21 as the origin is set. The virtual camera 300 defines a visual axis L for specifying the visual-field image VF (see FIG. 7) to be displayed on the HMD 110. The uvw coordinate system that defines the visual field of the virtual camera 300 is determined so as to synchronize with the uvw coordinate system that is defined about the head of the user U in the real space. Further, the virtual camera 300 may be moved in the virtual space 200 in synchronization with the movement in the real space of the user U wearing the HMD 110.

Next, in Step S2, the control unit 121 specifies a visual field CV (see FIG. 6) of the virtual camera 300. Specifically, the control unit 121 acquires information relating to a position and an inclination of the HMD 110 based on data representing the state of the HMD 110, which is transmitted from the position sensor 130 and/or the HMD sensor 114. Next, the control unit 121 specifies the position and the direction of the virtual camera 300 in the virtual space 200 based on the information relating to the position and the inclination of the HMD 110. Next, the control unit 121 determines the visual axis L of the virtual camera 300 based on the position and the direction of the virtual camera 300, and specifies the visual field CV of the virtual camera 300 based on the determined visual axis L. In this case, the visual field CV of the virtual camera 300 corresponds to a part of the region of the virtual space 200 that can be visually observed by the user U wearing the HMD 110 (in other words, corresponds to a part of the region of the virtual space 200 to be displayed on the HMD 110). Further, the visual field CV has a first region CVa set as an angular range of a polar angle α about the visual axis L in the xy plane in FIG. 6A, and a second region CVb set as an angular range of an azimuth β about the visual axis L in the xz plane in FIG. 6B. The control unit 121 may specify the line-of-sight direction of the user U based on data representing the line-of-sight direction of the user U, which is transmitted from the eye gaze sensor 140, and may determine the direction of the virtual camera 300 based on the line-of-sight direction of the user U.

As described above, the control unit 121 can specify the visual field CV of the virtual camera 300 based on the data transmitted from the position sensor 130 and/or the HMD sensor 114. In at least one embodiment, when the user U wearing the HMD 110 moves, the control unit 121 can change the visual field CV of the virtual camera 300 based on the data representing the movement of the HMD 110, which is transmitted from the position sensor 130 and/or the HMD sensor 114. That is, the control unit 121 can change the visual field CV in accordance with the movement of the HMD 110. Similarly, when the line-of-sight direction of the user U changes, the control unit 121 can move the visual field CV of the virtual camera 300 based on the data representing the line-of-sight direction of the user U, which is transmitted from the eye gaze sensor 140. That is, the control unit 121 can change the visual field CV in accordance with the change in the line-of-sight direction of the user U.

Next, in Step S3, the control unit 121 generates visual-field image data representing the visual-field image VF to be displayed on the display unit 112 of the HMD 110. Specifically, the control unit 121 generates the visual-field image data based on the virtual space data defining the virtual space 200 and the visual field CV of the virtual camera 300, i.e., the viewpoint of the user U immersed in the virtual space.

Next, in Step S4, the control unit 121 displays the visual-field image VF on the display unit 112 of the HMD 110 based on the visual-field image data (see FIG. 7). As described above, the visual field CV of the virtual camera 300 changes in accordance with the movement of the user U wearing the HMD 110, and thus the visual-field image VF to be displayed on the display unit 112 of the HMD 110 changes as well. Thus, the user U can be immersed in the virtual space 200.

The virtual camera 300 may include a left-eye virtual camera and a right-eye virtual camera. In this case, the control unit 121 generates left-eye visual-field image data representing a left-eye visual-field image based on the virtual space data and the visual field of the left-eye virtual camera. Further, the control unit 121 generates right-eye visual-field image data representing a right-eye visual-field image based on the virtual space data and the visual field of the right-eye virtual camera. After that, the control unit 121 displays the left-eye visual-field image and the right-eye visual-field image on the display unit 112 of the HMD 110 based on the left-eye visual-field image data and the right-eye visual-field image data. In this manner, the user U can visually observe the visual-field image as a three-dimensional image from the left-eye visual-field image and the right-eye visual-field image. For the sake of convenience in description, the number of the virtual cameras 300 is one herein. As a matter of course, at least one embodiment of this disclosure is also applicable to a case where the number of the virtual cameras is more than one.

Figure 8:
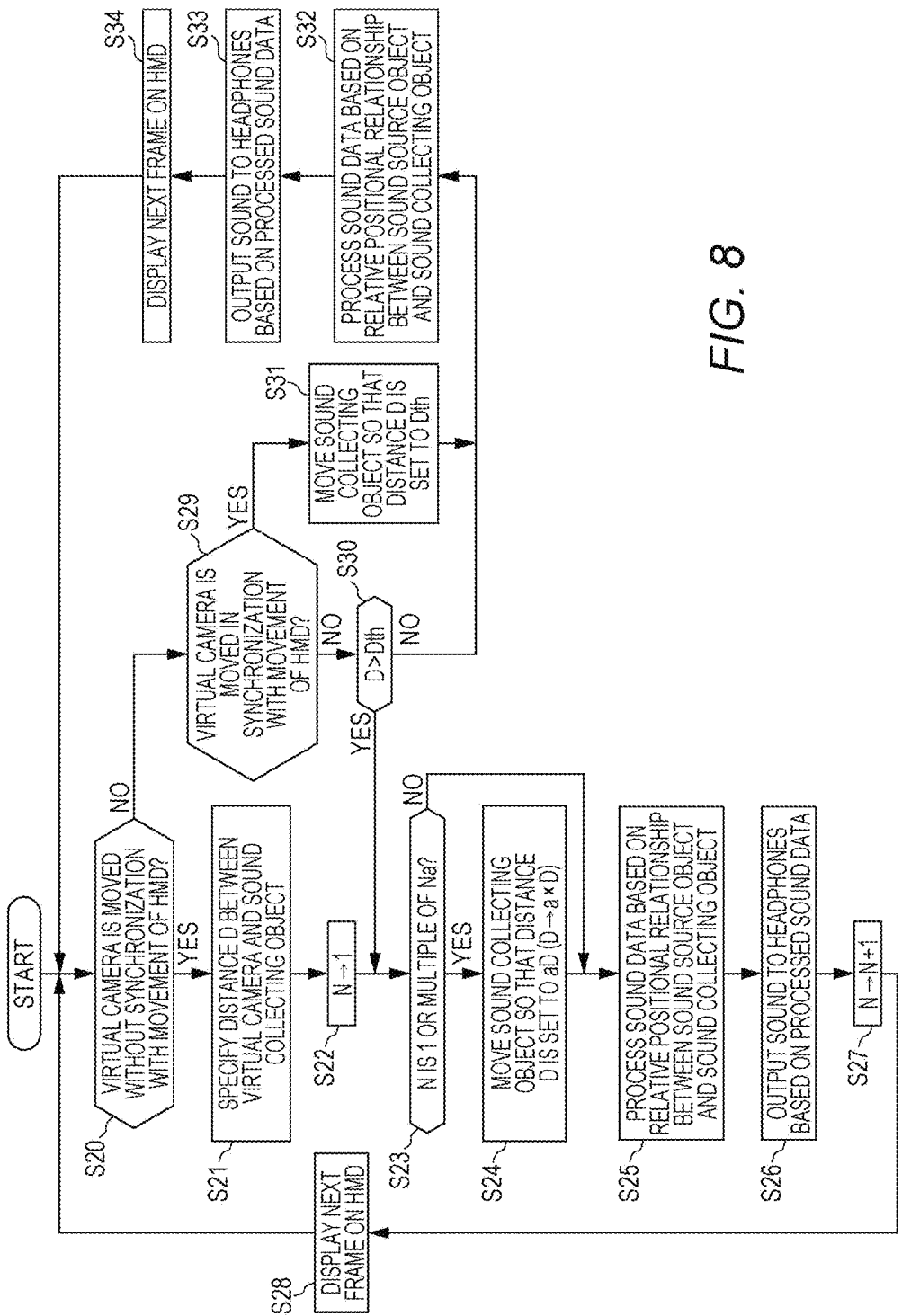
FIG. 8 is a flow chart of an information processing method according to at least one embodiment of this disclosure.

Next, the information processing method according to at least one embodiment is described with reference to FIG. 8 to FIG. 10. FIG. 8 is a flow chart of an information processing method according to at least one embodiment.

FIG. 9 is a schematic diagram of a manner in which the virtual camera 300 is moved close to a sound source object 500 according to at least one embodiment of this disclosure. FIG. 10 is a schematic diagram of a manner in which a sound collecting object 400 is moved so that a distance D between the moved virtual camera 300 and the sound collecting object 400 is set to $a \times D_0$ according to at least one embodiment of this disclosure. FIG. 11 is a schematic diagram of a manner in which the sound collecting object 400 is moved so that the distance D between the moved virtual camera 300 and the sound collecting object 400 is set to $a^2 \times D_0$ according to at least one embodiment of this disclosure.

First, in FIG. 9, the virtual space 200 (see FIG. 5) includes the virtual camera 300, the sound collecting object 400, the sound source object 500, and various objects (not shown, such as an enemy avatar or a friend avatar). The control unit 121 generates the virtual space data defining the virtual space 200 including those objects.

The sound collecting object 400 is defined as a sound collector configured to collect sounds propagating in the virtual space 200. The sound collecting object 400 is separated from the virtual camera 300, and follows the virtual camera 300. In particular, the sound collecting object 400 is arranged close to the virtual camera 300 under a state in which the distance D between the sound collecting object 400 and the virtual camera 300 is set to a predetermined distance Dth. In at least one embodiment, the predetermined distance Dth refers to a distance with which the sound collecting object 400 and the virtual camera 300 are considered to be sufficiently close to each other to permit the user U to experience the sound collected by the sound collecting object 400 for immersion in the virtual space, and may be changed as appropriate depending on the specification of the game program. Further, the sound collecting object 400 may be transparent. In at least one embodiment, the sound collecting object 400 is not displayed on the visual-field image VF. The sound source object 500 is defined as a sound source of the sound data. For example, the sound source object 500 is an audience object that is watching a sports game (tennis) and cheering, or a blast object (for example, a tank or a bomb) that generates a blast in a battlefield. In at least one embodiment, in FIG. 9, the virtual camera 300 moves without synchronization with the movement of the HMD 110, and the moved virtual camera 300' is positioned close to the sound source object 500. However, in the information processing method according to at least one embodiment, the sound source object 500 may not necessarily be present close to the moved virtual camera 300'.

In FIG. 8, in Step S20, the control unit 121 determines whether or not the virtual camera 300 is moved without synchronization with the movement of the HMD 110. For example, when the user U operates the operation button of the external controller 320 to instantaneously move the virtual camera 300, the control unit 121 determines that the virtual camera 300 is moved without synchronization with the movement of the HMD 110. Specifically, the external controller 320 generates an instruction signal for instructing the virtual camera 300 to move based on the input operation of the user U to the operation button, and transmits the generated instruction signal to the control device 120. The control unit 121 of the control device 120 receives the instruction signal via the I/O interface 124, and instantaneously moves the virtual camera 300 to a predetermined position on the virtual space 200 based on the received instruction signal. After that, the control unit 121 determines that the virtual camera 300 is moved without synchronization with the movement of the HMD 110. The control unit 121 may determine that the virtual camera 300 is moved without synchronization with the movement of the HMD 110 after the virtual camera 300 is instantaneously moved in response to a predetermined event (for example, changing sides in the tennis game) occurs.

When the control unit 121 determines that the virtual camera 300 is moved without synchronization with the movement of the HMD 110 (YES in Step S20), the control unit 121 specifies the distance D between the virtual camera 300 and the sound collecting object 400 (Step S21). Specifically, the control unit 121 specifies the distance D between the virtual camera 300 and the sound collecting object 400 based on the position of the moved virtual camera 300' and the position of the sound collecting object 400. The distance D may be the shortest distance between the moved virtual camera 300' and the sound collecting object 400.

Next, in Step S22, the control unit 121 sets a number N of a frame when the virtual camera 300 is moved to N=1. In at least one embodiment, the frame refers to a still image forming a moving image. For example, in a case of a game moving image, the number of still images (frames) to be displayed on the HMD 110 for 1 second is 90, and the frame rate (number of frames/second) is 90 fps.

Next, in Step S23, the control unit 121 determines whether or not the number N of the frame is 1 or a multiple of Na. In at least one embodiment, Na is an integer that is larger than 1, and may be changed as appropriate depending on the specification of the game program. For example, in the case of Na=30, the control unit 121 executes the processing of Step S24 for every 30 frames. In at least one embodiment, when the frame rate of the game moving image is 90 fps, the control unit 121 executes the processing defined in Step S24 at intervals of about 0.3 second.

When the control unit 121 determines that the number N of the frame is 1 or a multiple of Na (YES in Step S23), the control unit 121 moves the sound collecting object 400 so that the distance D is set to $a \times D$ (D→$a \times D$) (Step S24). In other words, the control unit 121 moves the sound collecting object 400 so that a value $a \cdot D$ obtained by multiplying the distance D between the moved virtual camera 300' and the sound collecting object 400 by a predetermined coefficient a (a is a value that is smaller than 1) becomes the new distance between the virtual camera 300 and the sound collecting object 400.

For example, as illustrated in FIG. 9, when the distance D between the moved virtual camera 300' and the sound collecting object 400 before the processing defined in Step S24 is executed is $D_0$, the distance D between the virtual camera 300 and the sound collecting object 400 after the processing defined in Step S24 is executed once is $D = a \times D_0$ (see FIG. 10). Further, in FIG. 10, the sound collecting object 400 (represented by the solid line) after being moved is positioned on a line segment connecting the sound collecting object 400 before being moved (represented by the broken line) and the moved virtual camera 300'. The control unit 121 specifies the position of the sound collecting object 400 after being moved based on the distance $D = a \times D_0$, the position of the sound collecting object 400 before being moved, and the position of the virtual camera 300 after being moved. For example, a position vector of the sound collecting object 400 after being moved may be calculated based on Expression (1).

$$\begin{cases} p_3 = t(p_1 - p_2) + p_1 \\ |p_2 - p_3| = a \cdot D_0 \end{cases} \quad (1)$$

$p_1$: position vector of sound collecting object 400 before being moved
$p_2$: position vector of virtual camera 300 after being moved
$p_3$: position vector of sound collecting object 400 after being moved
t: parameter The predetermined coefficient a is a value that is smaller than 1 (for example, 0.9), and may be changed as appropriate depending on the specification of the game program. For example, when Na is large, the predetermined coefficient a may be decreased. In contrast, when Na is small, the predetermined coefficient a may be increased. Further, in at least one embodiment, in the case of N=1 (that is, in a frame when the virtual camera 300 is moved), the control unit 121 executes the processing of Step S24.

Further, when the control unit 121 determines that the number N of the frame is not 1 or a multiple of Na (NO in Step S23), the processing proceeds to Step S25.

Next, the control unit 121 processes the sound data associated with the sound source object 500 based on the relative positional relationship between the sound source object 500 and the sound collecting object 400 (Step S25). For example, in general, when the distance between the sound collecting object 400 and the sound source object 500 is large, the volume (sound pressure level) of the sound to be output to the headphones 116 is decreased. In contrast, when the distance between the sound collecting object 400 and the sound source object 500 is small, the volume of the sound to be output to the headphones 116 is increased. As described above, the control unit 121 determines the volume (sound pressure level) of the sound data based on the distance between the sound source object 500 and the sound collecting object 400.

Regarding this point, the control unit 121 may determine the volume of the sound data by referring to a lookup table (LUT) or a function representing the relationship between the volume of the sound data and the distance between the sound collecting object 400 and the sound source object 500. For example, when the volume at a reference distance $R_0$ is known, the control unit 121 may determine the volume of the sound data by referring to Expression (2).

$$L = L_0 - 20 \log(R/R_0) \quad (2)$$

R: distance between sound collecting object 400 and sound source object 500
$R_0$: reference distance between sound collecting object 400 and sound source object 500
L: volume (dB) of sound data at distance R
$L_0$: volume (dB) of sound data at reference distance $R_0$ Further, the control unit 121 may determine a predetermined head-related transfer function based on the relative positional relationship between the sound collecting object 400 and the sound source object 500, and may process the sound data based on the determined head-related transfer function and the sound data.

Next, in Step S26, the control unit 121 outputs the sound to the headphones 116 based on the processed sound data. After that, the control unit 121 increments the number N of the frame by 1 (N→N+1), and displays the next frame (still image) on the HMD 110 (Step S28).

Next, the processing of Step S20 is executed again on the next frame. When the control unit 121 determines that the virtual camera 300 is moved without synchronization with the movement of the HMD 110 (NO in Step S20), the control unit 121 determines whether or not the virtual camera 300 is moved in synchronization with the movement of the HMD 110 (Step S29). When the control unit 121 determines that the virtual camera 300 is moved in synchronization with the movement of the HMD 110 (YES in Step S29), the control unit 121 moves the sound collecting object 400 so that the distance D between the moved virtual camera 300 and the sound collecting object 400 is set to the predetermined distance Dth (Step S31). After that, the control unit 121 executes processing of Step S32 and processing of Step S33.

On the other hand, when the control unit 121 determines that the virtual camera 300 is not moved in synchronization with the movement of the HMD 110 (NO in Step S29), the control unit 121 determines whether or not the distance D is larger than the predetermined distance Dth (Step S30). When the control unit 121 determines that the distance D is equal to or smaller than the predetermined distance Dth (NO in Step S30), the control unit 121 executes the processing of Step S32 and the processing of Step S33. The processing of Step S32 is the same as the processing of Step S25 described above, and the processing of Step S33 is the same as the processing of Step S26 described above.

After that, the control unit 121 displays the next frame (still image) on the HMD 110, and then executes the processing of Step S20 on the next frame. On the other hand, when the control unit 121 determines that the distance D is larger than the predetermined distance Dth (YES in Step S30), the control unit 121 executes the processing of Step S23. As described above, the processing of Step S24 is repeatedly executed until the distance D becomes equal to or smaller than the predetermined distance Dth.

In at least one embodiment, when N=Na is satisfied as a result of increase of the number N of the frame, the control unit 121 determines that the number N of the frame is Na (YES in Step S23), and then moves the sound collecting object 400 so that the distance D is set to a×D (D→a×D) (Step S24). In FIG. 11, the distance D between the virtual camera 300 and the sound collecting object 400 after the processing defined in Step S24 is executed twice is $D=a^2 \times D_0$. The control unit 121 specifies the position of the sound collecting object 400 after being moved based on the distance $D=a^2 \times D_0$, the position of the sound collecting object 400 before being moved, and the position of the virtual camera 300 after being moved.

Further, when the processing of Step S24 is executed n times, the distance D between the virtual camera 300 and the sound collecting object 400 is $D=a^n \times D_0$. As described above, by repeatedly executing Step S24, the sound collecting object 400 can be moved so that the distance D between the moved virtual camera 300 and the sound collecting object 400 is gradually decreased.

With at least one embodiment, in response to a determination that the virtual camera 300 is moved without synchronization with the movement of the HMD 110, the distance D between the moved virtual camera 300' and the sound collecting object 400 is specified based on the position of the moved virtual camera 300 and the position of the sound collecting object 400, and the sound collecting object 400 is moved so that the distance D is gradually decreased. As described above, when the virtual camera 300 instantaneously moves without synchronization with the movement of the HMD 110, the sound collecting object 400 does not instantaneously move so as to follow the virtual camera 300, but gradually moves so as to approach the virtual camera 300 as illustrated in FIG. 10 and FIG. 11. Therefore, a risk of a situation where a loud sound is suddenly output from the headphones 116 is reduced or prevented, and the sense of immersion to the virtual space 200 (sense of presence in the virtual space 200) of the user U is prevented from being reduced. Therefore, providing the information processing method capable of preventing a situation where the user U immersed in the virtual space 200 is startled is possible, without reducing the sense of immersion to the virtual space of the user U.

Further, a determination is made whether or not the virtual camera 300 is moved without synchronization with the movement of the HMD 110 in each frame to be displayed on the HMD 110, and hence a risk of a situation where the user U immersed in the virtual space 200 is startled can be suitably reduced or prevented even when the virtual camera 300 is instantaneously moved.

Further, as in Step S30, the sound collecting object 400 is moved so that the distance between the virtual camera 300 and the sound collecting object 400 is gradually decreased until the distance D becomes equal to or smaller than the predetermined distance Dth. In this manner, even when the virtual camera 300 is instantaneously moved, the distance D between the virtual camera 300 and the sound collecting object 400 becomes equal to or smaller than the predetermined distance Dth, and hence the sense of immersion to the virtual space 200 can be suitably prevented from being reduced.

Further, as described with reference to Step S24, the sound collecting object 400 is moved so that the value a×D obtained by multiplying the distance D between the virtual camera 300 and the sound collecting object 400 by the predetermined coefficient a (a<1) is the new distance between the virtual camera 300 and the sound collecting object 400. Then, the processing of Step S24 is repeatedly executed. As described above, the sound collecting object 400 can be moved so that the distance D between the virtual camera 300 and the sound collecting object 400 is gradually decreased.

Further, as in Step S23, the sound collecting object 400 is moved only in the frame satisfying a predetermined condition, and hence the distance D between the virtual camera 300 and the sound collecting object 400 can be gradually decreased at appropriate time intervals. For example, when the frame rate is 90 fps and Na=30 is satisfied, the distance between the virtual camera 300 and the sound collecting object 400 is gradually decreased at intervals of about 0.3 second. As described above, a risk of a situation where the user U immersed in the virtual space 200 is startled can be reliably reduced or prevented.

Further, with at least one embodiment, the sound collecting object 400 is moved immediately after a determination that the virtual camera 300 is moved. Therefore, the performance of the sound collecting object 400 to follow the virtual camera 300 is increased, and the sense of immersion to the virtual space 200 is suitably prevented from being reduced.

Figure 12:
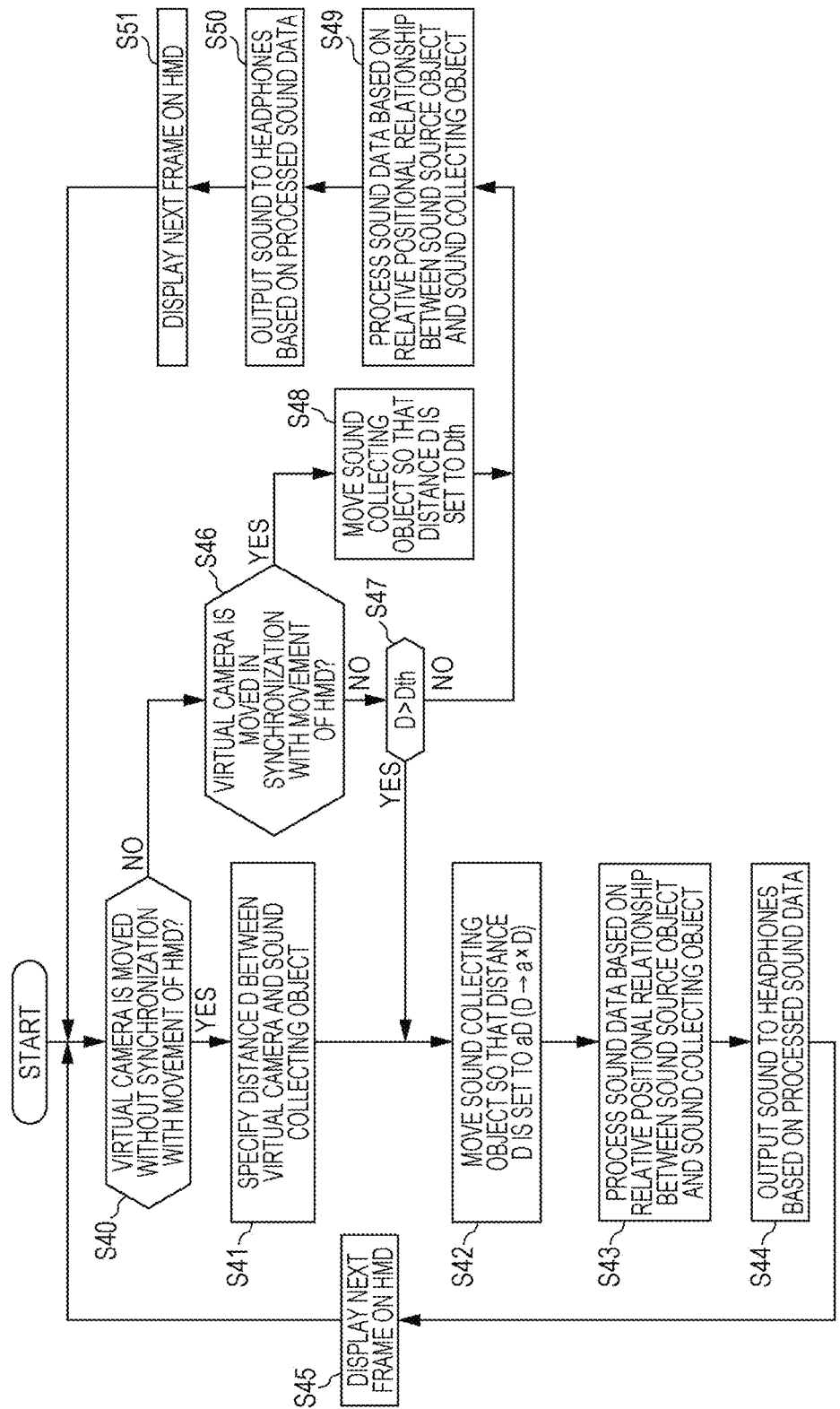
FIG. 12 is a flow chart of an information processing method according to at least one embodiment of this disclosure.

Next, an information processing method according to at least one embodiment is described with reference to FIG. 12. FIG. 12 is a flow chart of a information processing method according to at least one embodiment of this disclosure. In FIG. 12, the information processing method in FIG. 12 differs from the information processing method illustrated in FIG. 8 in that the sound collecting object 400 is moved so that the distance D is set to aD (D→a×D) in each frame. In other words, in the information processing method illustrated in FIG. 8, the processing of Step S24 is executed only when the frame satisfies the condition shown in Step S23. Meanwhile, in the information processing method illustrated in FIG. 12, the processing of Step S42 is executed in each frame without providing a specific condition. The information processing method in FIG. 12 differs from the information processing method illustrated in FIG. 8 in this point.

Each step of processing from Step S40 to Step S51 illustrated in FIG. 12 corresponds to one of the steps of the processing from Step S20 to Step S34 illustrated in FIG. 8, and hence description of the processing from Step S40 to Step S51 is omitted herein for the sake of brevity.

In at least one embodiment of the information processing method in FIG. 12, in each of the plurality of frames, the sound collecting object 400 is moved so that the value a×D obtained by multiplying the distance D between the virtual camera 300 and the sound collecting object 400 by the predetermined coefficient a (a<1) becomes the new distance between the virtual camera 300 and the sound collecting object 400. In this manner, the sound collecting object 400 approaches the moved virtual camera 300 as quickly as possible. Therefore, the performance of the sound collecting object 400 to follow the virtual camera 300 is increased, and the sense of immersion to the virtual space 200 (that is, the sense of presence in the virtual space 200) can be suitably prevented from being reduced.

Further, in order to achieve various types of processing to be executed by the control unit 121 with use of software, instructions for a display control system for executing a display control method of at least one embodiment may be installed in advance into the storage unit 123 or the ROM. Alternatively, instructions for the display control system may be stored in a computer-readable storage medium, for example, a magnetic disk (HDD, a floppy disk), an optical disc (for example, CD-ROM, DVD-ROM, and Blu-ray disc), a magneto-optical disk (for example, MO), or a flash memory (for example, an SD card, a USB memory, and an SSD). In at least one embodiment, the storage medium is connected to the control device 120, and thus the instructions stored in the storage medium is installed into the storage unit 123. Then, instructions for the display control system installed in the storage unit 123 is loaded onto the RAM, and the processor executes the loaded instructions. In this manner, the control unit 121 executes the display control method of at least one embodiment.

Further, instructions for the display control system may be downloaded from a computer on the communication network 3 via the communication interface 125. Also in this case, the downloaded instructions are similarly installed into the storage unit 123.

This concludes description of at least one embodiment of this disclosure. However, the description of the at least one embodiment is not to be read as a restrictive interpretation of the technical scope of this disclosure. The at least one embodiment is merely given as an example, and it is to be understood by a person skilled in the art that various modifications can be made to the at least one embodiment within the scope of this disclosure set forth in the appended claims. Thus, the technical scope of this disclosure is to be defined based on the scope of this disclosure set forth in the appended claims and an equivalent scope thereof.

What is claimed is:

1. An information processing method comprising:
  generating virtual space data that defines a virtual space in which a user wearing a head mounted display (HMD) is immersed, wherein the virtual space includes:
    a viewpoint of the user immersed in the virtual space,
    a sound collecting object, which is separated from the viewpoint of the user and follows the viewpoint of the user, and
    a sound source object, which is defined as a sound source of sound data;

processing the sound data based on a relative positional relationship between the sound collecting object and the sound source object;

instructing a sound outputting unit to output a sound based on the processed sound data; and determining whether or not the viewpoint of the user is moved without synchronization with the movement of the HMD, the information processing method further comprising, in response to a determination that the viewpoint of the user is moved without synchronization with the movement of the HMD, specifying a distance between the viewpoint of the user and the sound collecting object based on a position of the moved viewpoint of the user and a position of the sound collecting object; and moving the sound collecting object so that the distance between the moved viewpoint of the user and the sound collecting object is decreased while maintaining a position of the moved viewpoint of the user.

2. The information processing method according to claim 1, wherein determining whether the viewpoint of the user is moved without synchronization with movement of the HMD comprises determining whether or not the viewpoint of the user is moved without synchronization with the movement of the HMD in each frame of the visual-field image.

3. The information processing method according to claim 1, wherein moving the sound collecting object is executed until the distance between the moved viewpoint of the user and the sound collecting object becomes equal to or smaller than a predetermined value.

4. The information processing method according to claim 1, wherein moving the sound collecting object comprises:

moving the sound collecting object so that a value obtained by multiplying the distance between the moved viewpoint of the user and the sound collecting object by a predetermined coefficient is a new distance between the virtual camera and the sound collecting object, the predetermined coefficient being less than 1, the sound collecting object after being moved being positioned on a line segment connecting the sound collecting object before being moved and the moved viewpoint of the user, repeating moving the sound collecting object based on the value obtained by multiplying the distance between the moved viewpoint of the user and the sound collecting object by the predetermined coefficient.

5. The information processing method according to claim 4, wherein, when a predetermined frame of a plurality of frames of the visual-field image satisfies a predetermined condition, moving the sound collecting object based on the value obtained by multiplying the distance between the moved viewpoint of the user and the sound collecting object by the predetermined coefficient is executed in the predetermined frame.

6. The information processing method according to claim 4, wherein moving the sound collecting object based on the value obtained by multiplying the distance between the moved viewpoint of the user and the sound collecting object by the predetermined coefficient is executed in each frame of a plurality of frames of the visual-field image.

7. The information processing method according to claim 4, wherein, in response to a determination that the viewpoint of the user is moved in a predetermined frame of a plurality of frames of the visual-field image, moving the sound collecting object based on the value obtained by multiplying the distance between the moved viewpoint of the user and the sound collecting object by the predetermined coefficient is executed in the predetermined frame.

8. A system comprising:

a head mounted display (HMD);

a sound outputting unit connected to the HMD;

a processor connected to the HDM; and a non-transitory computer readable medium connected to the processor, wherein the non-transitory computer readable medium contains instructions for causing the processor to:

generate virtual space data that defines a virtual space in which a user wearing the HMD is immersed, wherein the virtual space includes:

a viewpoint of the user immersed in the virtual space, a sound collecting object, which is separated from the viewpoint of the user and follows the viewpoint of the user, and a sound source object, which is defined as a sound source of sound data;

process the sound data based on a relative positional relationship between the sound collecting object and the sound source object;

instruct the sound outputting unit to output a sound based on the processed sound data; and determine whether or not the viewpoint of the user is moved without synchronization with the movement of the HMD, in response to a determination that the viewpoint of the user is moved without synchronization with the movement of the HMD:

specify a distance between the viewpoint of the user and the sound collecting object based on a position of the moved viewpoint of the user and a position of the sound collecting object; and move the sound collecting object so that the distance between the moved viewpoint of the user and the sound collecting object is decreased while maintaining a position of the moved viewpoint of the user.

* * * * *